United States Patent
Arora et al.

(10) Patent No.: US 9,224,173 B2
(45) Date of Patent: Dec. 29, 2015

(54) ORDERING ACTIVITIES AND NOTIFICATIONS WITHIN A COLLABORATION PLATFORM

(75) Inventors: Namrata Arora, San Jose, CA (US); Keith Griffin, Galway (IE); Ashok Varadhan, Tracy, CA (US); Nithya N. Vijayakumar, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 599 days.

(21) Appl. No.: 13/462,254

(22) Filed: May 2, 2012

(65) Prior Publication Data

US 2013/0297705 A1 Nov. 7, 2013

(51) Int. Cl.
*H04L 29/08* (2006.01)
*G06Q 50/00* (2012.01)
*G06Q 10/10* (2012.01)

(52) U.S. Cl.
CPC .............. *G06Q 50/01* (2013.01); *H04L 67/306* (2013.01); *G06Q 10/10* (2013.01)

(58) Field of Classification Search
CPC ..... H04L 51/32; H04L 67/306; H04L 65/403; G06Q 50/01; G06Q 10/10
USPC .......... 709/204, 205, 224; 715/733, 745, 751, 715/753
See application file for complete search history.

(56) References Cited

U.S. PATENT DOCUMENTS

| | | | |
|---|---|---|---|
| 7,529,741 B2 * | 5/2009 | Aravamudan et al. | 1/1 |
| 7,797,345 B1 | 9/2010 | Martino et al. | |
| 7,818,392 B1 | 10/2010 | Martino et al. | |
| 7,818,394 B1 | 10/2010 | Lawler et al. | |
| 7,831,684 B1 | 11/2010 | Lawler et al. | |
| 7,844,671 B1 | 11/2010 | Lawler et al. | |
| 7,856,449 B1 | 12/2010 | Martino et al. | |
| 7,860,889 B1 | 12/2010 | Martino et al. | |
| 8,010,619 B1 | 8/2011 | Lawler et al. | |
| 8,335,798 B2 * | 12/2012 | Achlioptas | 707/785 |
| 8,756,500 B2 * | 6/2014 | Harris et al. | 715/273 |
| 8,782,121 B1 * | 7/2014 | Chang | 709/202 |
| 2003/0050979 A1 * | 3/2003 | Takahashi | 709/204 |
| 2003/0216986 A1 * | 11/2003 | Hassan | 705/35 |
| 2005/0021750 A1 * | 1/2005 | Abrams | 709/225 |

(Continued)

OTHER PUBLICATIONS

Ringel, M. et al., "Automated Message Prioritization: Making Voicemail Retrieval More Efficient", (2 pages).

*Primary Examiner* — Uzma Alam
(74) *Attorney, Agent, or Firm* — Edell, Shapiro & Finnan, LLC

(57) ABSTRACT

A method, an apparatus and computer readable storage media facilitate establishing a communication session between a computing device of a user and at least one other computing device within a collaboration platform (system) to facilitate one or more communications between the user and other users associated with the platform. Updates are received to an account of the user that is accessible via the user's computing device, wherein the updates provide information relating to posted activities, notifications or other content and individuals associated with the posted activities, the posted activities, notifications or other content being available at one or more computing devices associated with the platform. The updates are automatically organized in at least one order based upon a profile of the user that is associated with the user's account. The computing device of the user provides a listing of the updates based upon an order determined by the organizing operation.

20 Claims, 14 Drawing Sheets

(56) References Cited

U.S. PATENT DOCUMENTS

| | | |
|---|---|---|
| 2005/0210102 A1* | 9/2005 | Johnson et al. ............... 709/204 |
| 2007/0265857 A1* | 11/2007 | Shivaji Rao ..................... 705/1 |
| 2008/0040673 A1* | 2/2008 | Zuckerberg et al. .......... 715/745 |
| 2009/0172127 A1* | 7/2009 | Srikanth et al. ............... 709/217 |
| 2009/0307345 A1* | 12/2009 | Carter et al. ................... 709/224 |
| 2010/0169789 A1* | 7/2010 | Cheng et al. ................... 715/738 |
| 2011/0208868 A1* | 8/2011 | Walsh et al. ................... 709/227 |
| 2012/0060120 A1* | 3/2012 | Aravamudan et al. ........ 715/811 |
| 2012/0192086 A1* | 7/2012 | Ghods et al. .................. 715/753 |
| 2012/0259675 A1* | 10/2012 | Roehrs et al. ................ 705/7.29 |
| 2012/0278428 A1* | 11/2012 | Harrison et al. .............. 709/217 |
| 2012/0296919 A1* | 11/2012 | Sinha et al. ................... 707/749 |
| 2013/0073989 A1* | 3/2013 | Harris et al. ................... 715/758 |
| 2013/0104251 A1* | 4/2013 | Moore et al. ..................... 726/30 |
| 2013/0290820 A1* | 10/2013 | Dhanani ........................ 715/205 |
| 2013/0304822 A1* | 11/2013 | Tetreault ....................... 709/204 |
| 2013/0325858 A1* | 12/2013 | Xu ................................. 707/730 |
| 2014/0052782 A1* | 2/2014 | Ryan et al. .................... 709/204 |
| 2014/0129942 A1* | 5/2014 | Rathod ........................... 715/720 |
| 2014/0337361 A1* | 11/2014 | Gailis ............................ 707/752 |

* cited by examiner

ORDERING ACTIVITIES AND NOTIFICATIONS WITHIN A COLLABORATION PLATFORM

TECHNICAL FIELD

The present disclosure relates to enhancing the performance of operations within collaboration platforms.

BACKGROUND

Collaboration platforms enhance productivity in the workplace or commercial environment by providing a mechanism for participants or users to engage in multiple forms of communication with many people that are related to topics of interest for each participant. For example, enterprise collaboration platforms facilitate the management of multiple projects by multiple team members at one or more geographic locations. A user typically has an account within the collaboration platform which includes information about the user's personal profile and from which the user can receive updates in the form of written communications about events occurring in different communities as well as obtain activity feeds from other users. Notifications are also typically communicated over the collaboration platform to the user's account, such as alerts and announcements as well as any personal notifications that are associated with the user's profile.

In certain scenarios, there may be many updates occurring in one community that could overwhelm any updates from other communities. This can then result in a user failing to see an important update due to the user's account being cluttered with other updates that are of less importance. In addition, if the user is utilizing a mobile device to access his or her account, the number of updates displayed on one or more pages associated with the account could be much lower in comparison to utilizing a browser for another computing device (e.g., a browser utilized by a laptop or desktop computer). This may further result in the user not viewing the most important updates from the mobile device due to the clutter of updates coming in to the user's account.

DESCRIPTION OF EXAMPLE EMBODIMENTS

Overview

A method, an apparatus and computer readable storage media facilitate establishing a communication session between a computing device of a user and at least one other computing device within a collaboration platform (system) to facilitate one or more communications between the user and other users associated with the platform. Updates are received to an account of the user that is accessible via the user's computing device, wherein the updates provide information relating to posted activities, notifications or other content and individuals associated with the posted activities, the posted activities, notifications or other content being available at one or more computing devices associated with the platform. The updates are automatically organized in at least one order based upon a profile of the user that is associated with the user's account. The computing device of the user provides a listing of the updates based upon an order determined by the organizing operation.

Example Embodiments

Collaboration platforms provide software tools or software application modules and related services linking computing devices to allow users to work together, e.g., in one or more particular settings (e.g., within an enterprise such as a company or organization, or in a collaborative effort between two or more enterprises) in an effort to achieve common business goals and strategies. The term "tool" is used herein to refer to an "application" software function or set of functions provided by a software application on a computing device and/or hosted on a server on behalf of a computing device. Application modules refer to a set of one or more software applications that provide the software tools used by the computing devices and/or servers. Some elements or features of a collaboration platform can include messaging (e.g., email, calendaring and scheduling, contact lists, etc.), team collaboration features (e.g., synchronization of documents or files common to a particular community or group associated with the files, including posted or edited web logs or blogs, wikis, other forms of written ideas and/or notes, etc.), and real time or near real time communications (e.g., instant messaging, short messaging service or SMS, web conferencing, white boarding, screen content or desktop sharing, voice, audio and/or video conferencing, etc.). An enterprise collaboration platform is particularly useful for large companies, organizations or other entities in that it is designed to facilitate high usage volume between many users (e.g., hundreds or thousands of employees in one or more companies, organizations or groups) as well as multiple simultaneous sessions with different groups or communities of users utilizing the platform.

Figure 1:
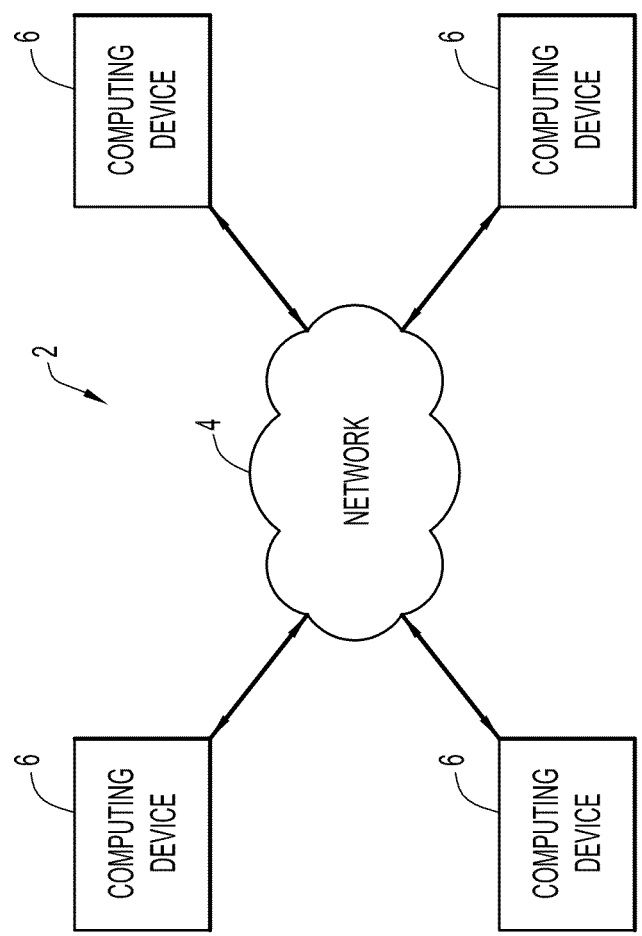
FIG. 1 is a schematic block diagram of an example system in which computing devices are connected to facilitate an enterprise collaboration platform in which computing devices communicate with each other.

Referring to FIG. 1, a block diagram is shown for an example system that supports operation of a collaboration platform in which a plurality of computing devices communicate and exchange information with each other. In particular, the system 2 comprises a network 4 that facilitates communications and exchange of information between a plurality of computing devices 6. It is noted that four computing devices 6 are shown for example purposes only. In a collaboration platform, such as an enterprise collaboration platform, the number of computing devices can be any suitable number (e.g., hundreds, thousands or more computing devices). Examples of types of networks that can be utilized within system 2 include, without limitation, any one or more of local or wide area networks, Internet Protocol (IP) networks such as intranet or internet networks, telephone networks (e.g., public switched telephone networks), wireless or mobile phone or cellular networks, and any suitable combinations thereof.

The network 4 can include one or more host servers that include suitable software applications to support the collaboration platform in a client/server relationship with the computing devices 6, where the computing devices also include one or more suitable collaboration software applications that facilitate communications and exchange of information with each other via the host server(s). Alternatively, the collaboration platform can be supported in any other suitable manner, in which one or more computing devices include one or more collaboration software applications that facilitate a suitable connection with other computing devices over the network 4 to provide communications and exchange of information associated with the collaboration platform.

Figure 2:
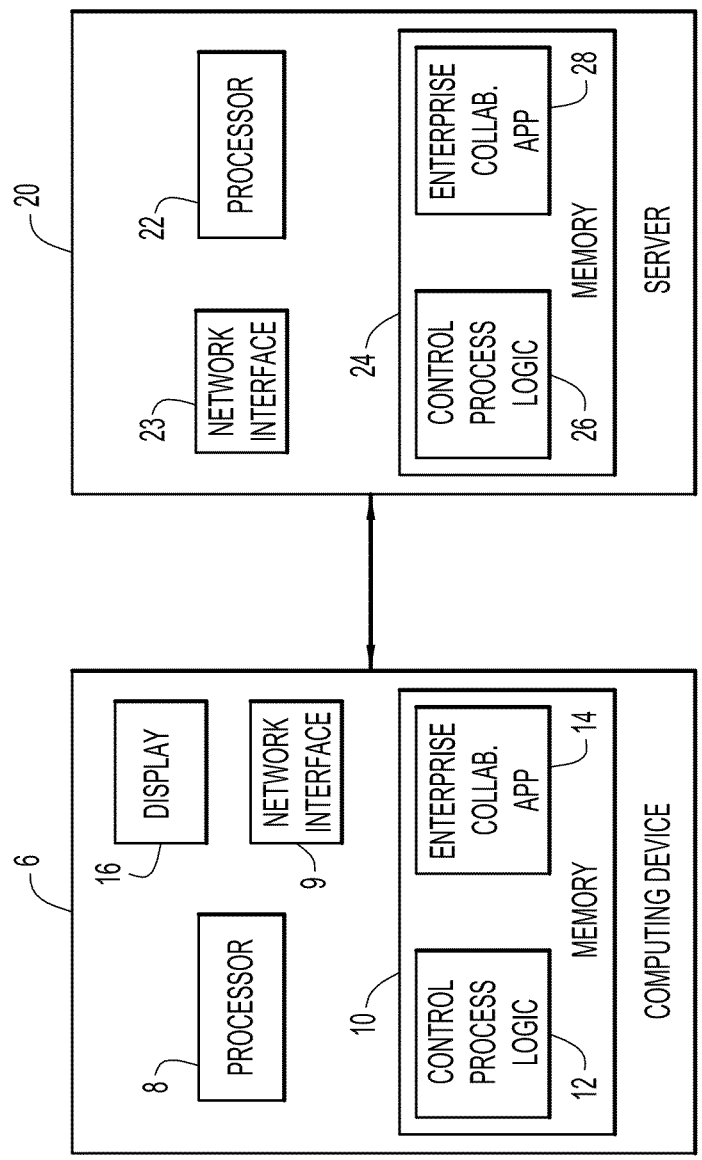
FIG. 2 is a schematic block diagram of an example computing device connected with a server that facilitates operations of an enterprise collaboration platform within the system of FIG. 1.

An example embodiment of an enterprise collaboration platform supported by one or more host servers in the network 4 of the system of FIG. 1 is depicted in the block diagram of FIG. 2. In particular, a computing device 6 connects with a host server 20 to facilitate communications and exchange of information with other computing devices 6 associated with users of the enterprise collaboration platform. It is noted that FIG. 2 represents how each computing device 6 of the system of FIG. 1 can connect with a server 20. It is further noted that, while the embodiment of FIG. 2 depicts a single server 20, the system 2 can include multiple servers that support the enterprise collaboration platform. Each computing device 6 connects via any suitable wireless and/or hard wired connection to a server 20 to facilitate communications and exchange of information with other computing devices over the network. In particular, each computing device 6 includes a processor 8, a network interface 9, a memory 10, and a display 16. Similarly, the server 20 includes a processor 22, a network interface 23, and memory 24. The computing devices 6 and/or servers 20 can further include any other suitable devices integrated with the devices and/or any other types of peripheral devices that can be connected with the devices to facilitate input of audio, video or other information by a user to the computing device (e.g., keyboards, mouse devices, cameras, microphones, etc.) as well as output or display of audio, video and/or other types of information to the user by the computing device.

The network interfaces 9 and 23 of the computing devices 6 and servers 20 can be, for example, one or more of an Ethernet interface card or switch, a modem, a router or any other suitable hardware device that facilitates a wireless and/or hardwire connection over the network 4 with one or more servers 20 and other computing devices 6, where the network interface unit can be integrated within the device or a peripheral that connects with the device.

Each of the processors 8, 22 can comprise a microprocessor that executes control process logic instructions 12, 26 stored within memory 10, 24, including operational instructions and software applications stored within such memory (e.g., applications associated with different types of communications and sharing of information via the enterprise collaboration platform).

For example, the memory 10 of each computing device 6 includes an enterprise collaboration application module 14 that comprises one or more software applications that provide software tools to facilitate connection of the computing device 6 to the enterprise collaboration platform, via one or more servers 20, and also engage in the various activities associated with the enterprise collaboration platform, including various types of communications, such as messaging (e.g., email, calendaring and scheduling, contact lists, etc.) and real time or near real time communications (e.g., instant messaging, short messaging service or SMS, web conferencing, white boarding, screen content or desktop sharing, voice, audio and/or video conferencing, etc.) as well as the exchange of information (e.g., sharing of documents or files common to a particular community or group associated with the files, including posted or edited web logs or blogs, wikis, other forms of written communications, etc.).

Similarly, the memory 24 of each server 20 includes an enterprise collaboration application module 28 that comprises one or more software applications that provide software tools to facilitate hosting by the server of the various activities and sharing of information associated with the enterprise collaboration platform. The processors 8 and 22 of the computing devices 6 and servers 20 perform operations in accordance with the steps set forth in the flow chart of FIG. 6 utilizing the enterprise collaboration application tools 14, 28, as described further below.

The memories 10, 24 of the computing devices 6 and servers 20 may comprise read only memory (ROM), random access memory (RAM), magnetic disk storage media devices, optical storage media devices, flash memory devices, electrical, optical, or other physical/tangible memory storage devices, and any combinations thereof. The display 16 of each computing device can be an LCD or any other suitable type of display, including touch pad displays (e.g., for tablets, smart phones, or other portable types of computing devices) for display of textual and/or graphical content by the processor 8 of the computing device 6, including video, textual, interactive or graphical user interface (GUI) content.

Some examples of computing devices 6 that can be used to engage and participate in an enterprise collaboration platform in system 2 include, without limitation, stationary (e.g., desktop) computers, personal mobile computer devices such as laptops, note pads, tablets, personal data assistant (PDA) devices, and other portable media player devices, and cell phones (e.g., smartphones) including suitable input and output devices as described above. The computing devices and servers can utilize any suitable operating systems (e.g., Android, Windows, Mac OS, Symbian OS, RIM Blackberry OS, Linux, etc.) to facilitate interaction, activities and sharing of information between computing devices via the enterprise collaboration platform.

Suitable servers 20 can be any suitable types of stationary or other types of computing devices capable of hosting and managing multiple collaboration sessions of varying types simultaneously as well as large flows of data associated with the enterprise collaboration platform. Each server 20 can be configured to provide the function of handling and transferring communication messages (e.g., email messages, audio and/or video conferencing content, instant or SMS messaging, etc.) between two or more computing devices 6 over the network 4. Each server 20 can also be provided with suitable memory capacity to store content associated with client communications for each customer device 6 (e.g., saved email messages, instant messaging or SMS communications, and/or audio/video communications, as well as other content (e.g., blogs, wikis, white boarding content and/or other types of activities, the sharing of documents, files or other content, e.g., content that is posted and available for access by users of groups or communities within the enterprise collaboration platform). In addition, each server 20 can have suitable software tools (e.g., utilizing software applications that are part of the enterprise collaboration application module 28 for each server 20) that facilitate the hosting of synchronous communications between the computing devices 6 as well as multiple simultaneous group communications (e.g., the simultaneous hosting of a web conference between a first group of computing devices and an instant messaging communication session between a second group of computing devices).

Thus, the configurations of computing devices 6 and servers 20 as described herein facilitate engagement and interactive participation in activities and other features by users within an enterprise collaboration platform, where the collaboration platform can include groups or communities in which groups of users are associated. The groups or communities within the collaboration platform can restrict users outside of the group or community from accessing content and/or engaging in communications with users who are designated members of the group or community. Examples of commercial software products and associated services that provide collaboration platforms having the functional features as previously described include, without limitation, Cisco Quad (Cisco Systems, Inc.), WebEx Connect (Cisco Systems, Inc.), Microsoft SharePoint (Microsoft Corporation) and LotusLive (IBM Corporation).

A user at a computing device 6 includes an account that is registered with and thus recognized by the collaboration platform, and this allows the user to engage in activities such as communications (e.g., email, audio or video communications, instant messaging, etc.) as well as post or edit information (e.g., in a blog or other written communication) and also send notifications to users within groups or communities with which the user is associated within the enterprise collaboration platform. The account of the user can include a graphical user interface (GUI) that provides information about the user's profile on one or more personal screens or pages of the collaboration platform that are navigable via the GUI. An example embodiment of content associated with the profile for a user within a collaboration platform is depicted as the graphical user interface (GUI) 50 of FIG. 3. In this example embodiment, a GUI 50 provides profile information about a user named Carl Brown, including tabs with windows for providing information relating to content and other features associated with the user's account. For example, one window can provide information relating to blogs or other written content posted by the user (e.g., posted entries associated with Carl's blog, as shown in the GUI 50). Other windows may provide information regarding a reporting structure for the user (e.g., a hierarchical chart or other data showing Carl's employment position in the company or enterprise and other positions of users with whom Carl reports to, such as an immediate and/or other supervisors or bosses at a higher level than Carl as well as potential users at a lower position with respect to Carl).

Figure 3:
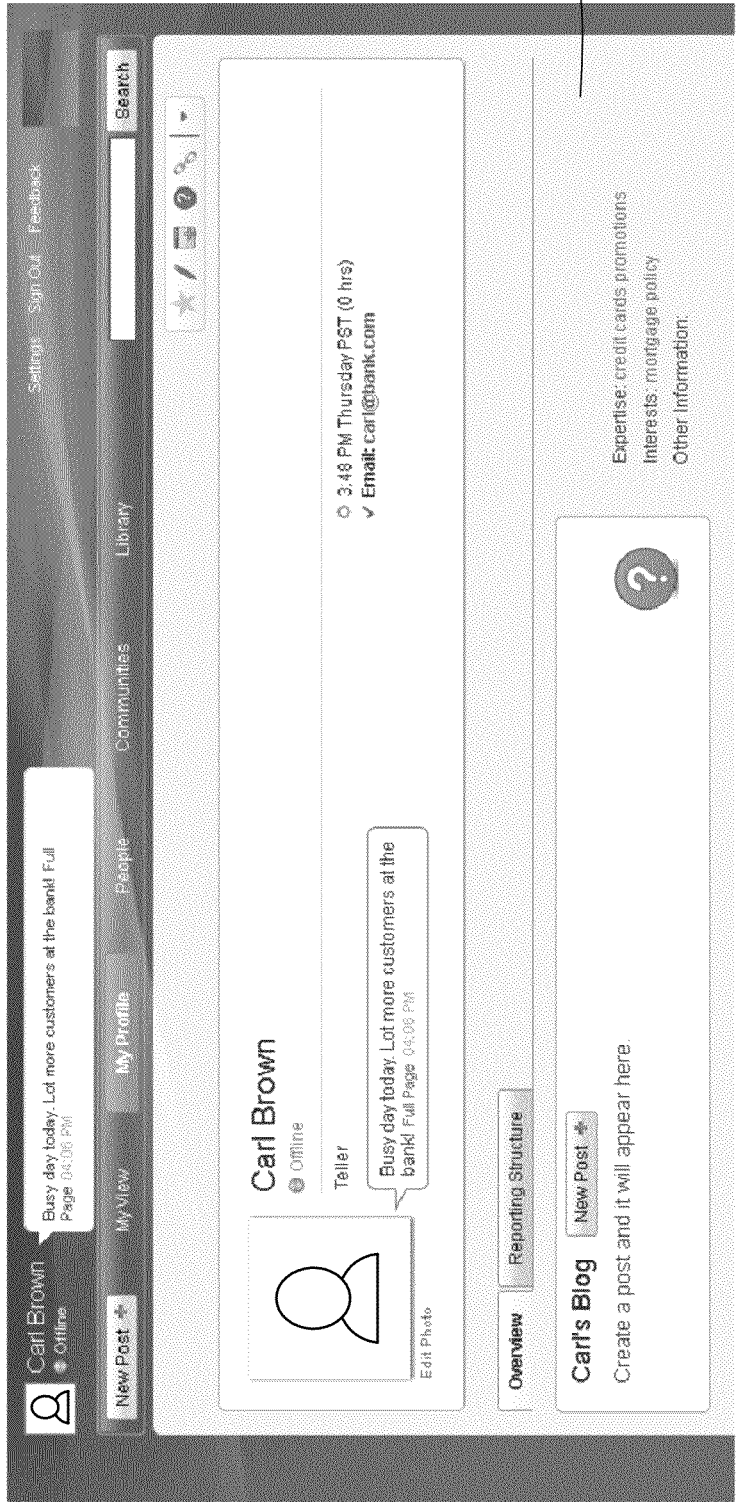
FIGS. 3, 3A, 4 and 5 depict example embodiments of graphical user interfaces for different users within an enterprise collaboration platform utilizing the system of FIG. 1.
Figure 3A:
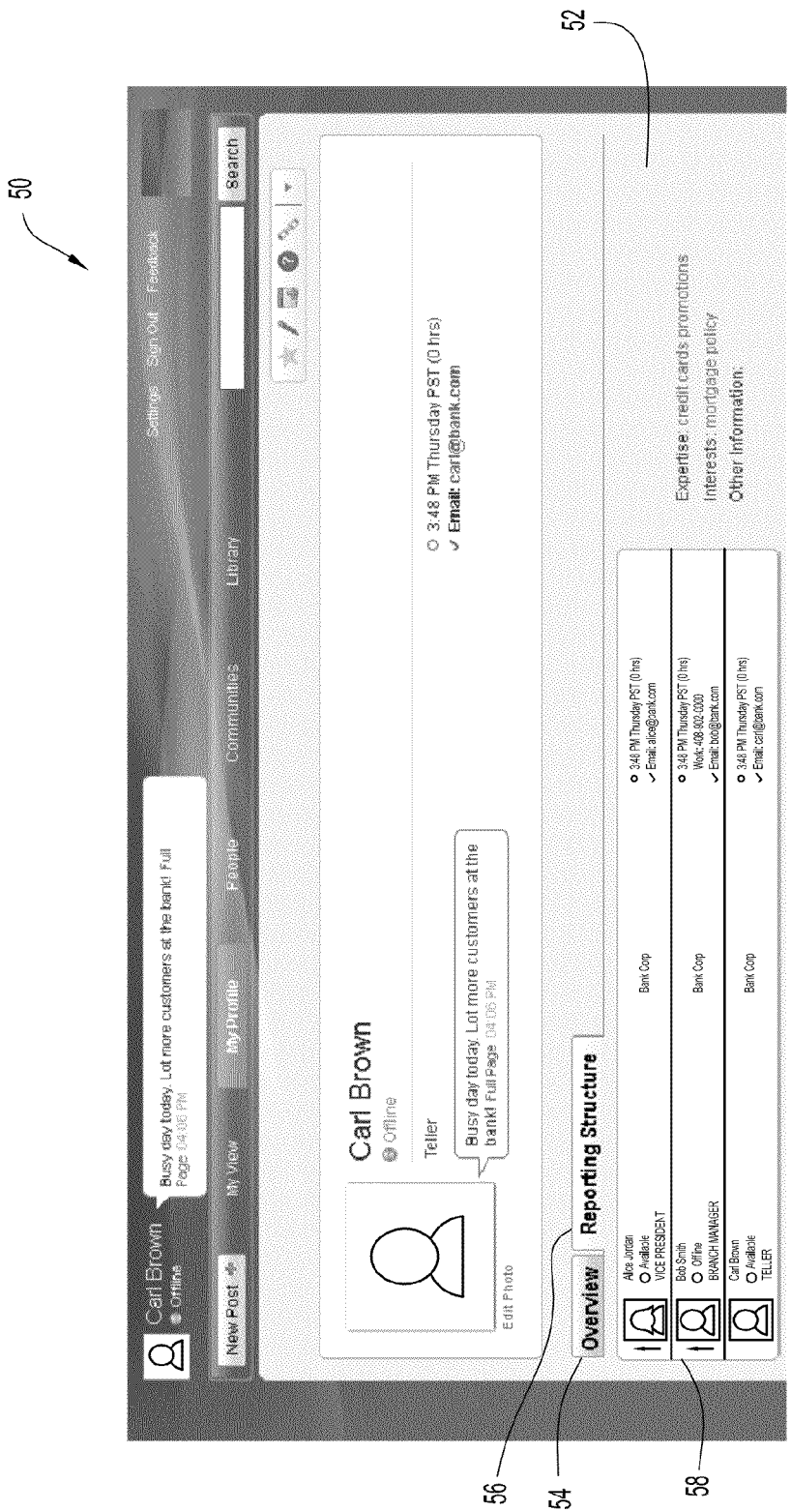

An example embodiment of a reporting structure for a user's personal profile (Carl Brown) is depicted in FIG. 3A. The GUI 50 includes the same content as that depicted for the GUI 50 of FIG. 3, with the exception that reporting structure information associated with a reporting structure tab 56 is shown in a window for the GUI 50 instead of information (e.g., a user's blog information) associated with an overview tab 54 (as shown in FIG. 3). As depicted in FIG. 3A, a reporting structure 58 for the user Carl Brown shows Carl's status (teller), Carl's immediate supervisor to whom Carl reports (Bob Smith—branch manager) and further supervisors above Carl's immediate supervisor to whom Carl may report (e.g., Alice Jordan, Vice President). Further information for each person in the reporting structure (e.g., email information, whether the person is currently online within the collaboration platform, etc.) can also be provided along with the person's reporting structure status. In this example, Carl is at the lowest level of the reporting structure. The reporting structures for other users (e.g., Bob Smith and Alice Jordan) may have one or more persons listed one or more levels below the listing of the user depending upon the management level at which the user is located.

Figure 4:
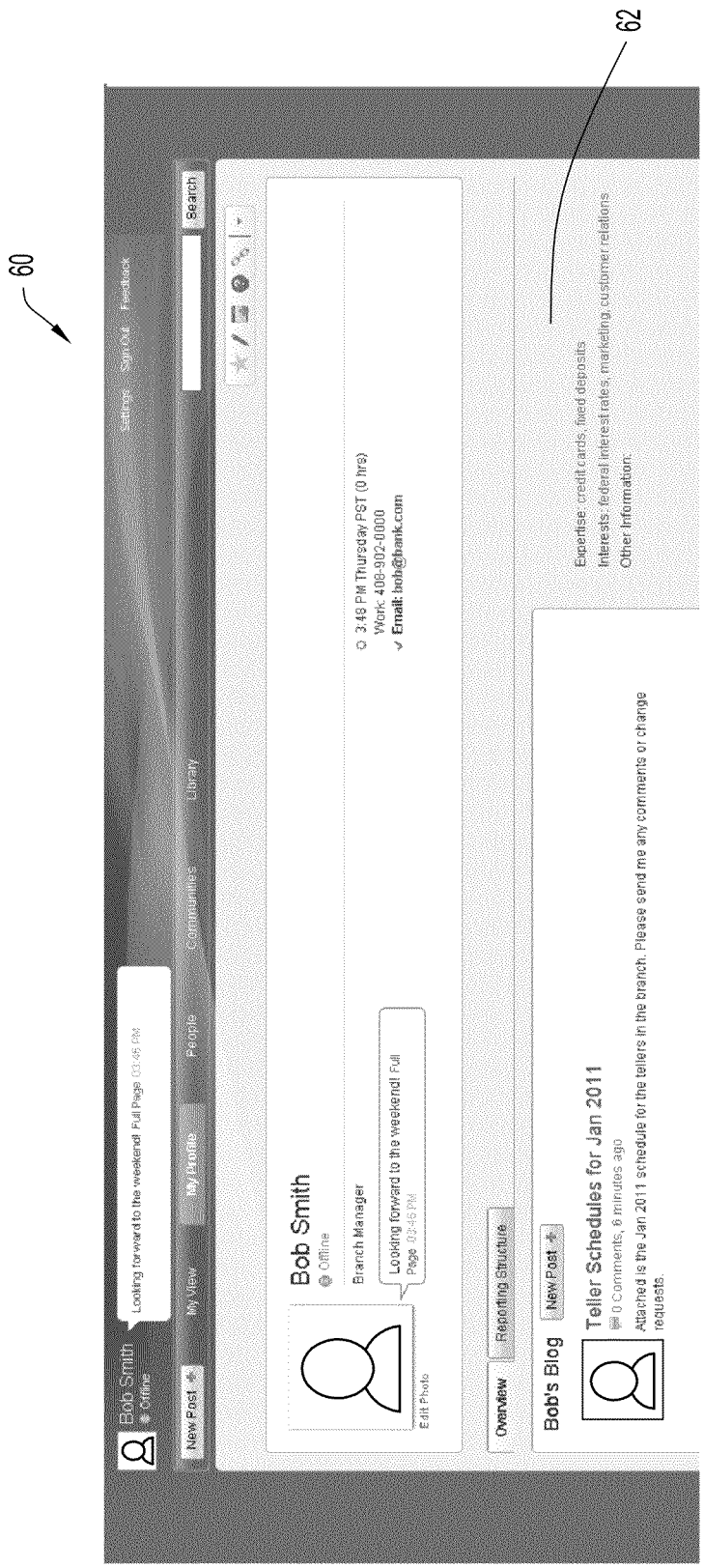
Figure 5:
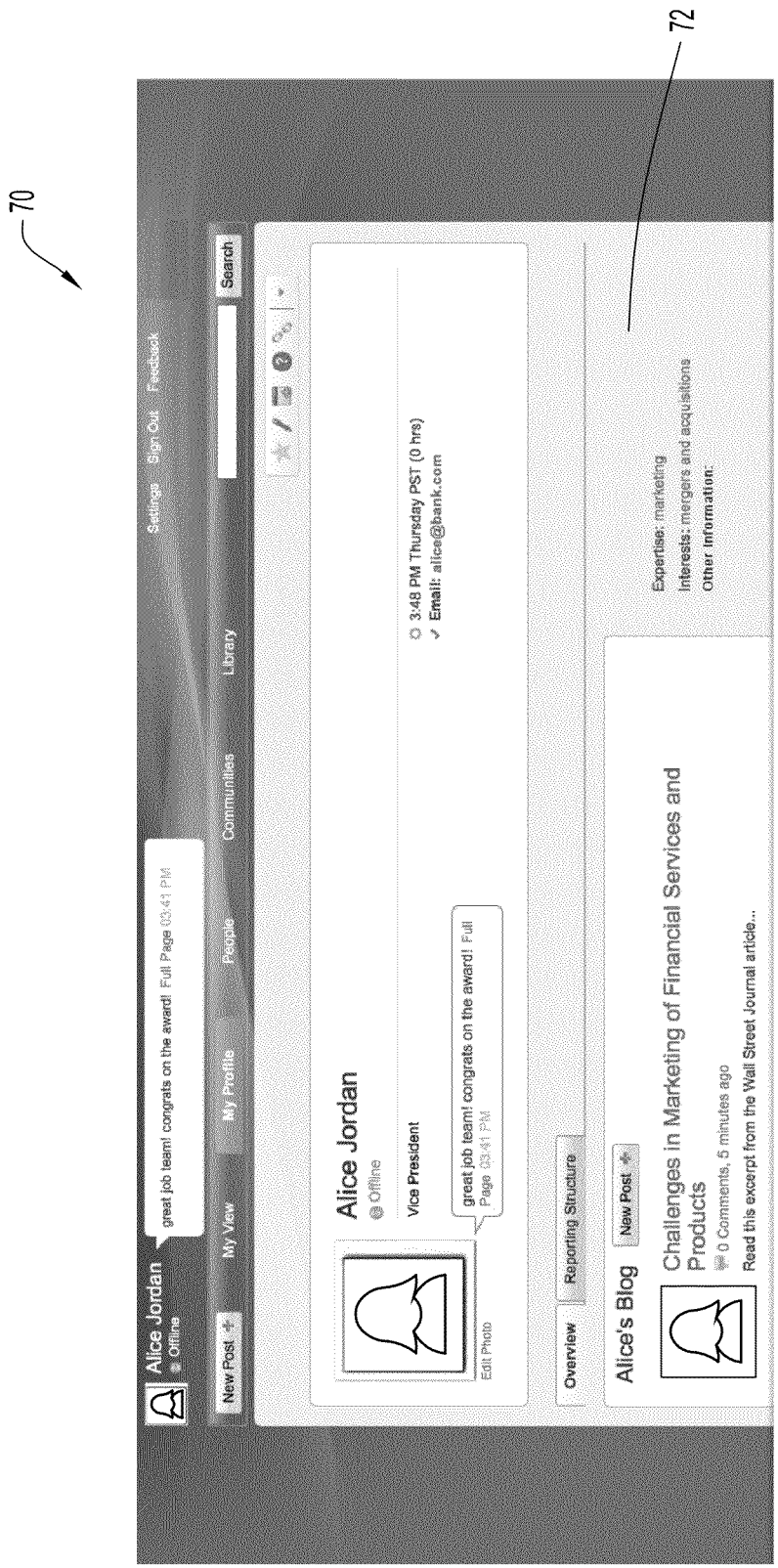

An important feature of a user's personal profile is the user expertise, interests and other information, shown as section 52 within GUI 50. In particular, section 52 includes an "expertise" category for the user, which lists one or more keywords or phrases that describe areas of expertise for the user (for Carl, his expertise is listed as "credit cards promotions"). The section 52 also includes an "interests" category for the user, which lists keywords or phrases listing the user's interests (for Carl, his interests are listed as "mortgage policy") and can also list social connections or relationships for the user. The section 52 also includes an "other information" category for the user. While not specifically shown in the drawings, the "other information" category can include, for example, a tag cloud and/or social relationships of the user. A tag cloud displays keywords or phrases that are of interest to the user (e.g., in relation to interests or social relationships of the user), including weighting of such keywords or phrases to show that some are of greater importance or priority than others (where the weighting can be displayed by increasing font size, bolding, italicizing, underlining, etc. of certain keywords or phrases having higher priority or significance to the user in relation to other keywords or phrases in the tag cloud). The user's expertise, interests and other information (e.g., as defined or set forth in section 52 of GUI 50) help to establish an ordering of activities and notifications received by the user's account as described herein. Two additional GUIs 60, 70 are depicted in FIGS. 4 and 5, where these GUIs are associated with the users Bob Smith and Alice Jordan. As previously noted for FIG. 3A, the users Bob and Alice are related in a particular community to the user for GUI 50 (Carl Brown). The information associated with these users is utilized in an example scenario described herein to show prioritizing of updates received by these users utilizing different prioritizing schemes.

A top portion of the GUI 50 for a user's account provides further tab features allowing the user to view posts, people and communities with whom the user is associated, libraries of content accessible by the user's account, etc. The user can further engage in communications with other users within the collaboration platform (e.g., email, instant messaging, audio and/or video communications, etc.) and post, edit or view content associated with the user's account. As further described herein, the one or more personal profile pages of the user's account further allow the user to display updates in relation to incoming messages or other forms of communications, activities, notifications or other content related to the user's account in a listed manner.

Depending upon the number of groups or communities and/or users to which a user is associated in a collaboration platform, as well as the level of activity associated with such groups, communities and/or users, it is possible for a user to receive a significant number of updates in relation to activities, notifications and/or other types of content that are occurring within the collaboration platform. The user's account will typically post a listing of such updates in a chronological or temporal order (i.e., most recent updates are listed before older updates). However, some updates may have a greater importance or significance to the user than others. If there is a significant flow of updates at any given time, it is possible for certain updates (e.g., updates associated with a community of greater interest to the user) that may be of greater importance to the user to become pushed downward or "buried" within the temporally ordered list.

As described herein, the collaboration software application tools facilitate providing a listing of updates to a user's account that is ordered in accordance with a designated priority based upon the user's profile. One type of prioritized ordering that can be performed for the updates to a user's account relates to a heuristics based ordering that takes into consideration a user's work related project associations, both direct and indirect, as well as the reporting structure for a user. The heuristics based ordering is based on the assumption that an update related to a project in which the user directly or indirectly participates or a notification from user's direct manager (or a manager at some hierarchical point or location above the user in the user's reporting structure) is of higher priority than other updates. The information relating to work related projects to which the user is associated and also the user's reporting structure is provided in the user's account information (e.g., which can be viewed at one or more personal profile pages associated with the user's account). This information can be entered by the user at the user's computing device 6 and/or automatically learned utilizing the software tools provided by the enterprise collaboration application modules of the computing device 6 and/or one or more servers 20 associated with the computing device 6 and based upon the user's interactions with other users and groups or communities. For example, weighted linked data structures associated with the user's account can be generated by the enterprise collaboration application module 14 of the user's computing device 6 and/or by the enterprise collaboration application module 28 of a server 20 within the platform that is associated with the computing device 6. The linked data structures can be charted, e.g., as nodes with links between the nodes being heavier (e.g., thicker, bolder and/or of different colors) to designate a stronger or more significant weight indications between two or more nodes. Thus, a linked data structure for activities within a community associated with the user's account would show a heavier weighted link between an activity associated with the user's direct manager (or the manager of the user's direct manager) in relation to an activity by another user that has no significant relationship to the user in the reporting structure hierarchy of the user.

Another type of ordering of updates to a user's account is a semantic based ordering that utilizes the user's expertise, interest and other information (e.g., a tag cloud associated with terms or phrases associated with the user and/or the user's social relations) that are associated with the user's account (e.g., other people, communities or informational content with whom the user most frequents or is most associated). The semantic based ordering can utilize information that is input by the user to indicate such information about the user (e.g., entries provided by the user in GUI in relation to the user's expertise, interest and other information, such as the information provided at section 52 in the GUI 50 for Carl, or information provided at sections 62, 72 for the GUIs 60, 70 of Bob and Alice). The information can also be automatically learned utilizing the software tools provided by the enterprise collaboration application modules of the computing devices and servers of the platform and based upon the user's interactions with other users and groups or communities. Data can be automatically collected in relation to the user's social activities within the collaboration platform and used to form a social graph of linked data, with weighting of data based upon a determined level of interest of the user with regard to such social activities (e.g., based upon the frequency with which the user communicates with other users, visits and/or participates in particular blogs or other posted content, the frequency with which certain topics are identified in content visited by the user, etc.). For example, utilizing the semantic based ordering, a blog posted by a direct friend of a user (where the user's account has identified such user as a friend and/or linked data identifies such user as a friend based upon the frequency of communications the user engages in with the friend) would have higher prioritization in relation to another blog posted by another user which qualifies as an update in the user's account (e.g., due to the blog coming from a community with which the user is associated) but the other blog poster has no friend status with respect to the user or an indirect friend status (e.g., friend-of-a-friend status). Alternatively, a blog poster which has no direct friend status with respect to the user can be elevated in priority status if the blog poster is designated as an expert within a particular community with which the user is associated or in relation to a particular topic to which the user has an interest.

Information that determines the ordering of updates to the user's account (e.g., heuristic-based or semantic-based) can be determined based upon static content that is retrieved from a content store (e.g., information stored at one or more servers 20) when a user first logs into his or her account associated with the collaboration platform utilizing their computing device 6. The ordering of updates can also be determined based upon dynamic content that is pushed to the user using asynchronous update mechanisms regardless of client type (e.g., fixed or mobile). Some non-limiting examples of content delivery mechanisms that can be used to provide dynamic content for purposes of ordering updates to a user's account include, without limitation, as Comet, BOSH (Bidirectional-streams Over Synchronous HTTP), Websockets and Server Sent Events in HTML5.

Different types of information can be weighted differently in one or more algorithms that prioritize the updates to a user's account for heuristics based and/or semantic based ordering. For example, in a heuristics based ordering structure, the reporting structure can assign weighted values as follows: all levels above the user (e.g., a direct manager of the user, the manager of the manager of the user, etc.) are assigned a weight =1r. In addition, any level directly below the user (e.g., people who report directly to the user) may also be assigned a weight=1r, whereas others below the user extending more than one node or "hop" from the user receive no special weight. For projects or areas in which the user is directly associated, a weight =1p can be assigned. The weighted values of r and p can be assigned in any selected manner (e.g., r=p, r>p, or r<p). From this, a heuristics based priority weight (also referred to as "HPW") can be assigned for each update that is received at a user's account. Different weights can also be applied for expertise, interest and other (e.g., social relationships) categories utilized to determine semantic based ordering, where a semantic recommendation weight (also referred to as "SRW") can be applied to updates to determine ordering of such updates using this ordering scheme.

An example embodiment showing specific ordering of updates for different users (the three users associated with the GUIs 50, 60 and 70 of FIGS. 3-5) is described in detail herein. In addition, an ordering of updates to a user's account can also be implemented that combines both heuristic based ordering and semantic based ordering in a selected algorithm to prioritize the listing of updates.

The user's account can provide the option (via one or more GUIs associated with the account) for the user to list updates based upon temporal order, heuristics based order or semantic based order, where the user can further be provided with an option to easily switch between the different orders (e.g., by providing the different ordered listing of updates in a tab configuration at a GUI associated with the user's account). A filtering option can also be provided that allows the user to filter updates based upon any selected criteria including, without limitation, reporting structure (e.g., if the user only wants to see updates from the user's manager or other users at a higher level in relation to the user within the reporting structure), particular topics, groups or communities of interest, locations of users associated with updates, etc. Ordering of the entire list of updates is still preserved during filtering, such that the user has the option of navigating from one page displayed by the user's computing device showing a filtered list of updates back to another page showing the original list of updates.

Another feature associated with the ordering is a notification provided for each ordered update regarding a reason for why a particular update has been prioritized higher in relation to other updates within the list. The software application tools of the enterprise collaboration application module 14, 28 of one or both the computing device 6 associated with the user and the server 20 supporting the computing device 6 over the platform can be configured to assign a specific notification for each update based upon the ordering (e.g., heuristic based or semantic based) which can be displayed (e.g., when the user selects a particular update) to provide the user with the reason for such ordering of the update. For example, a notification of "message from your supervisor" can be assigned to an update for a heuristics based ordering. In another example, a notification of "post relating to federal interest rates" assigned to a semantic based ordering in which a user's interests relate to federal interest rates.

Figure 6:
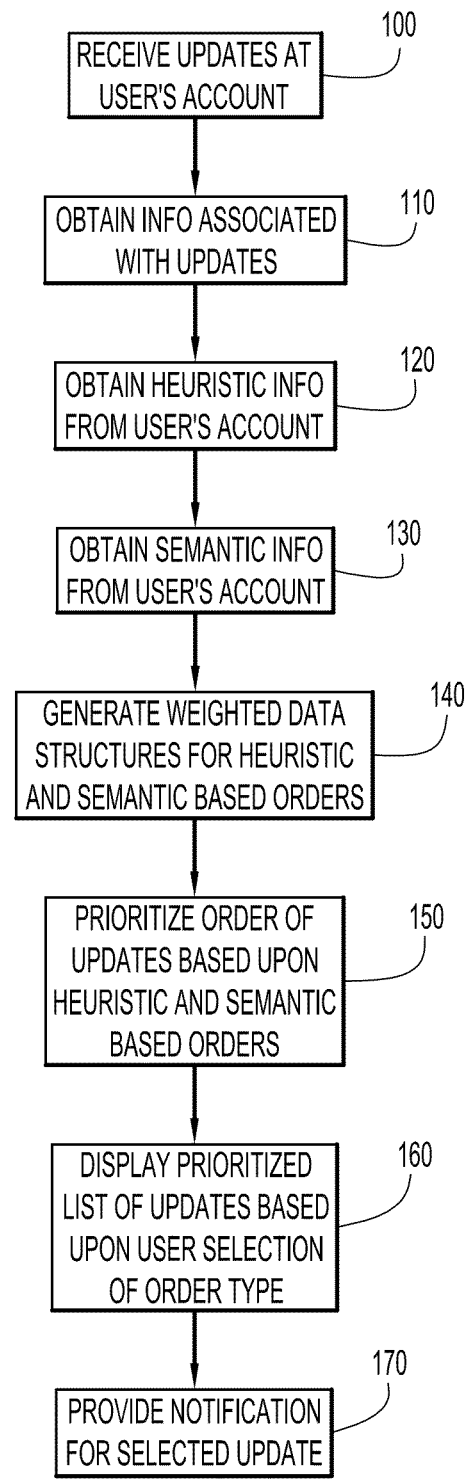
FIG. 6 is a flow chart depicting an example process for ordering activities displayed for the account of a user within an enterprise collaboration platform utilizing the techniques described herein.

Operation of an enterprise collaboration platform utilizing the system depicted in FIGS. 1 and 2 is now described with reference to the flow chart of FIG. 6. A computing device 6 is logged into the enterprise collaboration platform so as to facilitate communications with other users (e.g., email, instant messaging, audio and/or video communications, etc.) as well as the exchange of information with other users. At 100, the user's account receives updates that include a description of activities (e.g., postings to blogs), notifications (e.g., emails or other communications) and/or other content that has recently been posted or revised by users having an association with the user. At 110, the enterprise collaboration application module(s) 14, 28 of the computing device 6 and/or a host server 20 from which the computing device receives support analyzes incoming updates so as to obtain information associated with the updates that can be used for the heuristic and/or semantic based ordering (e.g., information regarding which user posted, edited, reviewed or is directly associated in any other manner with the activity, notification or other content associated with an update, one or more content descriptors associated with an update, etc.).

At 120, heuristic information is obtained from the user's account (e.g., based upon meta data associated with the user's account) relating to the reporting structure for the user (e.g., manager(s) directly above or at a designated number of levels or "hops" above the user in a hierarchical reporting structure of the company/enterprise, as well as user(s) directly below or at a designated number of levels or "hops" below the user in the reporting structure) and also projects to which the user is directly (optionally, also indirectly) associated. At 130, semantic information is obtained from the user's account based upon the user's expertise, interests and/or other information (e.g., as provided in the user profile section of the user's account, such as sections 52, 62, 72 in GUIs 50, 60 and 70).

At 140, weighted data structures such as linked data structures are generated for the heuristic and semantic based ordering of the updates. As previously noted, linked data structures can be generated, e.g., as a series of nodes representing the updates and links between the nodes, where the links can represent associations between nodes and also can represent the weighting of the nodes (e.g., based upon the thickness and/or color designation of the links). Another example of a weighted data structure that can be utilized to prioritize the listing of updates is a tag cloud data structure. A user's account may be configured to display at one or more pages tag clouds in which tags (e.g., keywords, phrases or terms) are displayed that are associated with a user's profile and can also be used to provide an indication of the user's interests (e.g., for semantic based ordering), where certain tags may have different font sizes and may be bolded, underlined and/or italicized to represent different weights associated with such tags. The tags and weighting of the tags can also be used in combination with the generated linked data structures to prioritize the update listing for the heuristic and/or semantic based ordering.

At 150, the ordering of the updates is prioritized based upon the heuristic and semantic based ordering schemes. As previously noted, the ordering can be based strictly on either heuristic or semantic based schemes. Alternatively, a prioritization can also be performed based upon a combination of the heuristic and semantic based schemes. A prioritized list of updates is displayed at 160 on the display 16 of the user's computing device 6 based upon a selected prioritization scheme by the user (e.g., the user can pick from temporal order, heuristics based order and semantic order to receive a listing of updates that is prioritized based upon the selected order). At 170, when a user selects a particular update from the displayed list (e.g., by highlighting the listed update via moving a pointer or other icon in the display window of the GUI associated with the user's account over the selected update), a notification relating to why the update was positioned in the prioritized order based upon the selected ordering scheme is displayed (e.g., in a pop up window associated with the displayed update).

An example embodiment of prioritizing updates for users in an enterprise collaboration platform is described herein utilizing the users associated with the GUIs 50, 60, and 70 of FIGS. 3-5. The users are fictional characters that are employees of a bank and are named Carl Brown (GUI 50), Bob Smith (GUI 60) and Alice Jordan (GUI 70). The following Table 1 provides information regarding the reporting structure (listing the user's manager), job title/profile, work projects and/or responsibilities (in the "Works On" column), expertise and interests for each user. The expertise, interests and other information are also listed in the section 52, 62, 72 of each GUI 50, 60, 70 for the users. As can also be seen from the information in Table 1, Bob is a direct manager for Carl, while Alice is a direct manager for Bob. The information (such as what each user works on, the user interests and expertise) can be entered by each user and/or determined automatically in the manners previously described herein.

TABLE 1

| | | | | User Information | | |
|---|---|---|---|---|---|---|
| S. No. | Employee Name | Job Profile | Manager Name | Works On | Expertise | Interests |
| 1 | Carl | Teller | Bob | Credit Cards | Credit Cards' Promotions | Mortgage Policy |
| 2 | Bob | Branch Manager | Alice | Supervises all tellers (Credit cards, Mortgages etc.) Manages schedules | Credit Cards Fixed deposits | Federal Interest rates Marketing Customer Relations |

TABLE 1-continued

User Information

| S. No. | Employee Name | Job Profile | Manager Name | Works On | Expertise | Interests |
|---|---|---|---|---|---|---|
| 3. | Alice | VP | N.A. | Manages all supervisors Marketing | Marketing | Mergers and Acquisitions |

Each of the users, Carl, Bob and Alice, receives updates throughout the day that are provided to each of their accounts (as depicted in the example GUIs 50, 60, 70 of FIGS. 3-5), where the updates are posted in a listing at a GUI that is accessible via the one or more account pages of each user. The different update listings are depicted in FIGS. 7-13 for the accounts of each of Carl, Bob and Alice. The updates comprise activities within communities of the collaboration platform (e.g., blogs, whitepages, wikis and/or any other forms of written communications that have been initially posted or revised/edited by a user) as well as notifications (e.g., notices of emails, instant messages and/or any other forms of communication from a user to one or more other users) and any other forms of content that can be exchanged between users via the collaboration platform.

Figure 7:
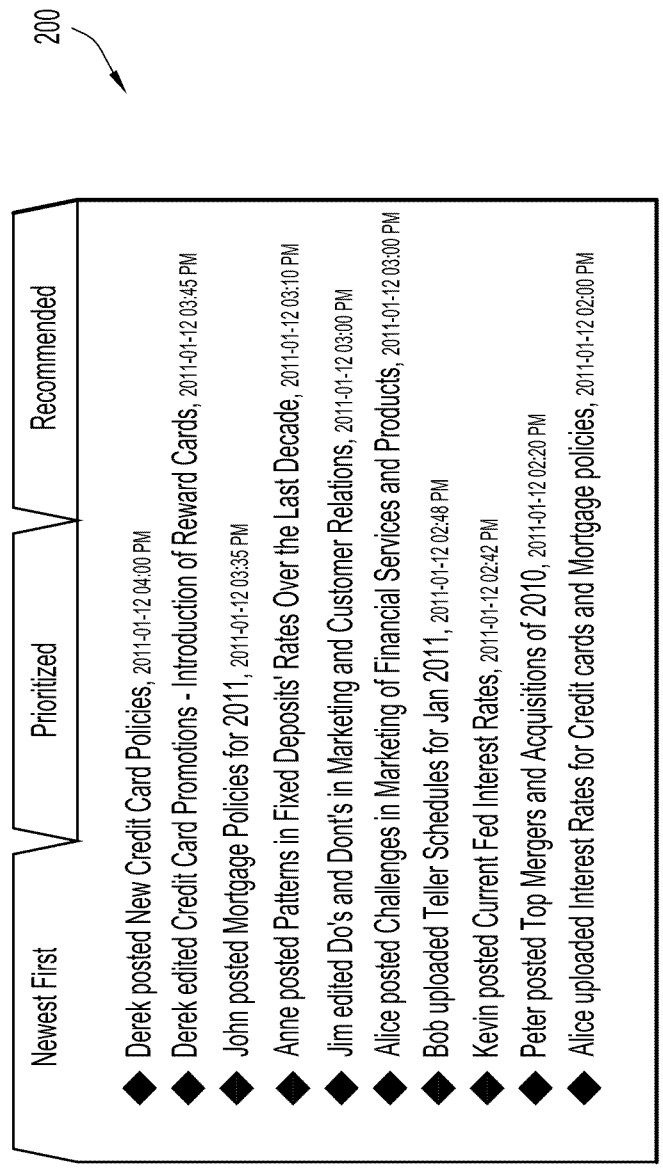
FIGS. 7-13 depict example embodiments of different ordered lists of activity updates for display within a graphical user image for a user within an enterprise collaboration platform utilizing the example process depicted in the flow chart of FIG. 6.

For simplicity purposes in this example, Carl, Bob and Alice all receive the same list of ten updates depicted in temporal ("Newest First") order as shown in FIG. 7, since the updates are from the same community (postings and uploaded documents within the banking organization in which these users are associated). However, it is noted that update listings can be different for other sets of users within the same collaboration platform, depending upon the communities with which the users may be associated and also the types of activities or notifications that may be directed to only specific users. The update listings can further include any number of updates (e.g., ten or more updates), depending upon the number of updates and the frequency with which such updates are flowing in to an account at any given period of time throughout the day. In addition, the update listings for a user's account can show a first set of listings (e.g., the first ten updates) with the user option to scroll through or select further sets of listings (e.g., the next ten updates, followed by the next ten updates, etc.).

Referring to FIG. 7, a temporal ("Newest First") listing 200 of updates is depicted for the account of each user, where the listing 200 can be displayed by a GUI for each user's account (such as the GUIs shown in FIGS. 3-5). Each update is time stamped, providing an indication of the time at which the update occurred. Each activity shown in the update listing refers to content that a user has provided for access within the platform, such as a blog that was posted or edited or a document that was uploaded to the platform (e.g., stored at a contents location such as within the memory 24 of one or more servers 20) for viewing by qualified users permitted access to such material. Each update can further comprise a link (e.g., a hypertext link) to the blog, document or other activity/notification/other content associated with the update that facilitates easy access by the user to the information associated with the update (e.g., by hovering with a pointer or other icon and clicking upon the particular update of interest from the list).

Utilizing the software tools provided by the enterprise collaboration application modules 14, 28 of the computing devices and/or servers, the heuristic and semantic information from each user's account is obtained and weighted data structures are generated to prioritize the updates based upon a heuristic ordering scheme and a semantic ordering scheme. The Table 2 below provides the listing of ten activities in the temporal order in which they occurred (i.e., as depicted in FIG. 7), with a heuristic priority weight (HPW) and a semantic recommended weight (SRW) assigned to each activity for Carl, Bob and Alice (based upon their specific profile information associated with their accounts). The activities or other updates can be associated with heuristic and semantic information of a user based upon a comparison of meta data or any other information associated with the updates (e.g., text within the titles, information about the author/current poster of the update, and/or any other data that provides a descriptor of the content of an update) and the heuristic/semantic information associated with the user.

TABLE 2

Weighting of Activities Based Upon Heuristic and Semantic Ordering

| S. No. | Activities | Author | Carl | Bob | Alice |
|---|---|---|---|---|---|
| 1 | New Credit Card Policies | Derek | HPW = 1, SRW = 0 | HPW = 1, SRW = 1 | HPW = 0, SRW = 0 |
| 2 | Credit Card Promotions - Introduction of Reward Cards | Derek | HPW = 1, SRW = 1 | HPW = 1, SRW = 1 | HPW = 0, SRW = 0 |
| 3 | Mortgage Policies for 2011 | John | HPW = 0, SRW = 1 | HPW = 1, SRW = 0 | HPW = 0, SRW = 0 |
| 4 | Patterns in Fixed Deposits' rates over the last decade | Anne | HPW = 0, SRW = 0 | HPW = 0, SRW = 1 | HPW = 0, SRW = 0 |
| 5 | Dos and Don'ts in Marketing & Customer Relations | Jim | HPW = 0, SRW = 0 | HPW = 0, SRW = 2 | HPW = 1, SRW = 1 |
| 6 | Challenges in Marketing of financial services and products | Alice | HPW = 1, SRW = 0 | HPW = 1, SRW = 1 | HPW = 1, SRW = 1 |
| 7 | Teller Schedules for January 2011 | Bob | HPW = 1, SRW = 0 | HPW = 1, SRW = 1 | HPW = 1, SRW = 0 |
| 8 | Current Fed Interest Rates | Kevin | HPW = 0, SRW = 0 | HPW = 0, SRW = 1 | HPW = 0, SRW = 0 |
| 9 | Top Mergers & Acquisitions of 2010 | Peter | HPW = 0, SRW = 0 | HPW = 0, SRW = 0 | HPW = 0, SRW = 1 |
| 10 | Interest rates for Credit Cards and Mortgage Policies | Alice | HPW = 2, SRW = 0 | HPW = 3, SRW = 1 | HPW = 1, SRW = 0 |

Based upon the different heuristic and semantic based weighting for Carl, Bob and Alice in relation to the activities, their prioritized views based upon heuristic ordering or semantic ordering will be different.

For example, when considering Carl's profile, his reporting structure is set such that Bob is his direct manager and Alice is also higher in the hierarchy of the reporting structure (since Alice is Bob's manager, as depicted in the reporting structure 58 of FIG. 3A). Carl also works on projects associated with credit cards, and his job profile is a bank teller. This information is determined from Carl's profile information in Carl's account. Therefore, activities relating to credit cards (for example, activities 1, 2 and 6) are given a higher heuristic weighting (HPW value of 1) in relation to other activities. In addition, activities posted or uploaded by users at a higher hierarchical level within the reporting structure associated with Carl's account are also given higher heuristic weighting values. For example, activity 7 was posted by Carl's direct manager, Bob, which results in a higher heuristic weighting (HPW value of 1) in relation to other activities. Further, activity 10 is associated with projects in which Carl is associated (credit cards) and was further posted by Alice, the manager of Bob (who is Carl's manager). Since this activity involves both a reporting structure weighting (since the post is by a manager at a higher hierarchical level than Carl within Carl's reporting structure) and a projects weighting, the heuristic weighting assigned this activity (HPW=2) is the greatest in relation to all other activities in the list.

Figure 8:
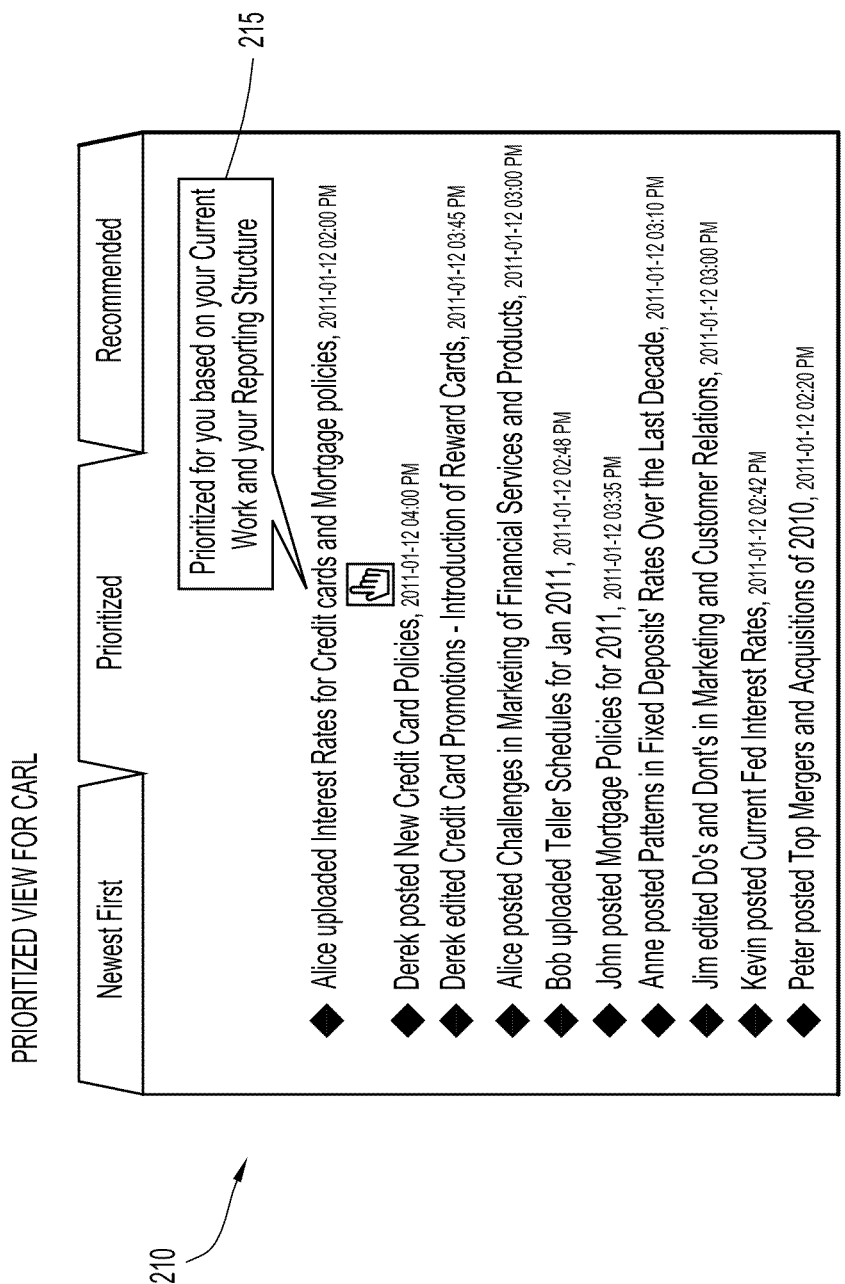

The heuristics based ordering applied to the list of updates for Carl is depicted in FIG. 8. As depicted in FIGS. 7-13, the top of each listing includes a tab that allows a user to switch from one ordered listing to another (when the listing is provided as one or more GUIs and/or informational pages accessible by the user via his or her account) by selecting the tab associated with the ordered listing. The heuristics based ordering in list 210 of FIG. 8 shows that activity 10 (from Table 2), which is at the bottom of the temporal ("Newest First") list, is shifted to the top of the list in the heuristics based ("Prioritized") listing of updates (due to the HPW value=2 for this activity). The order of other updates has also shifted based upon the heuristics ordering determined for each activity. For activities having the same heuristics ordering (HPW) value (e.g., HPW=0 or HPW=1), the ordering can be maintained as temporal (newest received updates appear before older received updates in the list).

When a user is interested in a particular update, the user can hover a pointer or other icon used to navigate features within the user's account over this update as shown in FIG. 8. This results in a notification or indication 215 (e.g., in the form of a bubble or window) providing a reason for the ordering of the update in the displayed list. For example, the indication 215, which is associated with activity 10, indicates that this update was prioritized because it is based upon Carl's current work projects and also his reporting structure. The user can further select an update of interest (e.g., by clicking upon activity 10 while hovering over it with the GUI pointer) so as to navigate to a window or other GUI that provides a copy of the content (e.g., display of the blog or a copy of the posted document or other content, or display of the notification associated with the update). Thus, activity 10, which may be of greater importance than other incoming updates to Carl's account, will be displayed at the top of the list in the heuristics based ordering to allow Carl to view and/or act upon this update quickly as opposed to possibly missing this update based upon the temporal ("Newest First") list that places activity 10 at a lower ordering (which could potentially bury this update beneath updates of lesser importance).

Figure 9:
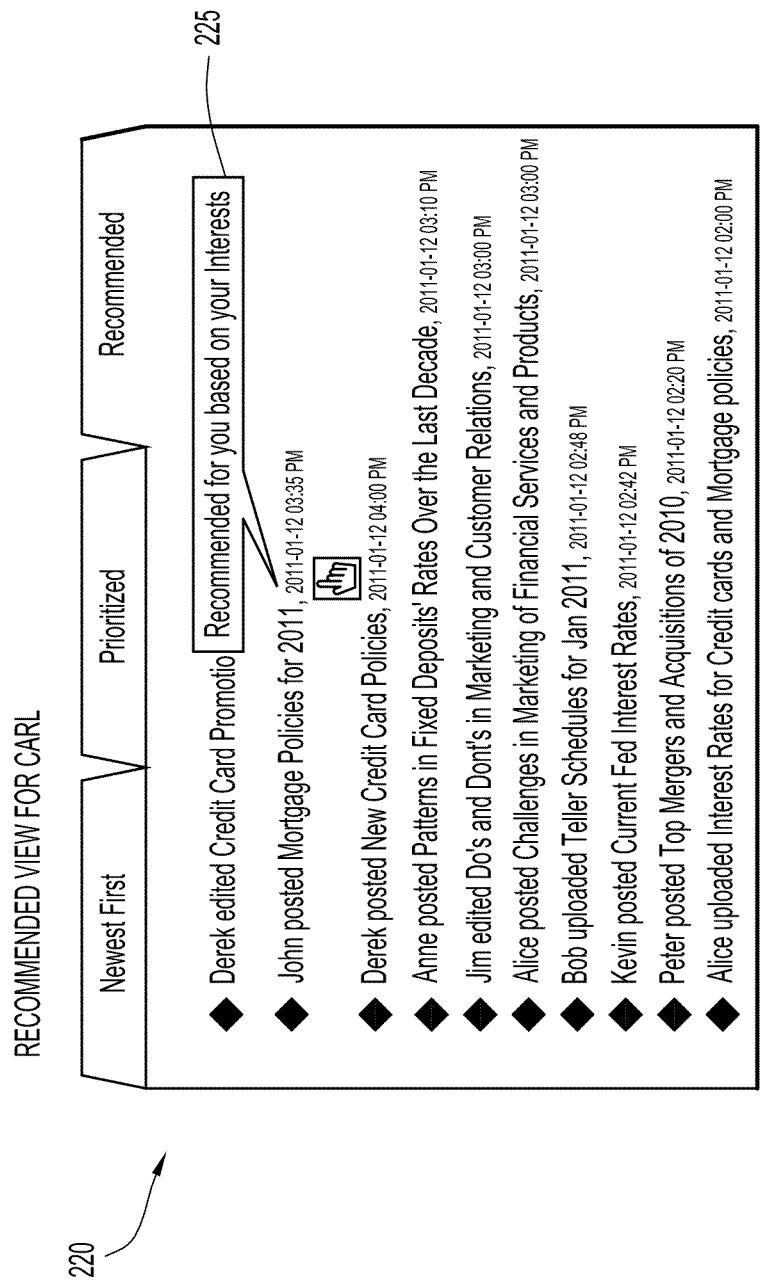

The semantics based ordering ("Recommended") list of updates for Carl is depicted in FIG. 9. This ordering of activities from Table 2 is based upon the semantic weighting (SRW) values and therefore differs from the other two ("Newest First"/temporal order and "Prioritized"/heuristics based order) listings. As shown in Table 2, activity 2 is assigned a value of SRW=1 due to the activity being associated with an expertise of Carl (credit card promotions), while activity 3 is also assigned a value of SRW=1 based upon an interest of Carl (mortgage policy). The other activities are assigned a value of SRW=0, since they are determined as not relating to any of the interests 52 associated with Carl's account. As depicted in the semantics based ("Recommended") listing of updates in FIG. 9, activity 2 is listed first followed by activity 3 immediately after activity 2, since both have SRW values of 1 and activity 2 was received in temporal order before activity 3 ("Newest First" order for activities 2 and 3, having the same SRW values). The remaining updates are listed in temporal ("Newest First") order after activities 2 and 3. Further, by hovering over either activity 2 or activity 3, a notification 225 (shown as the window or bubble in FIG. 9) appears providing a reason for such prioritization ("Recommended for you based on your interests").

Figure 10:
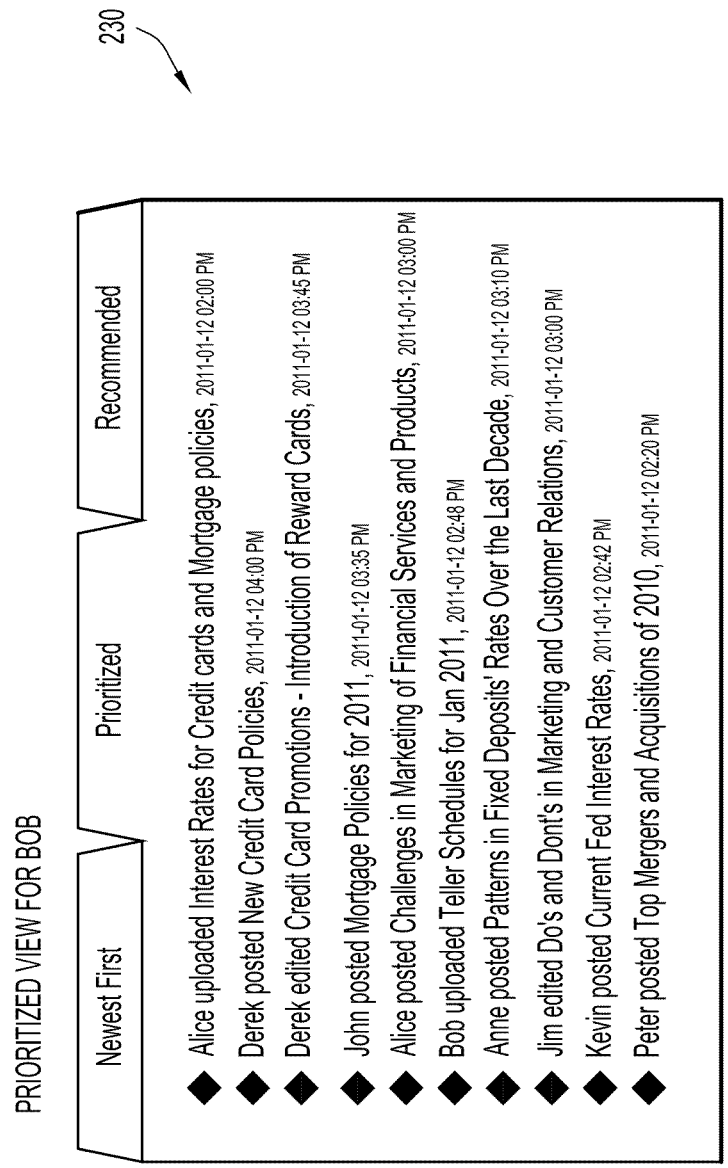
Figure 11:
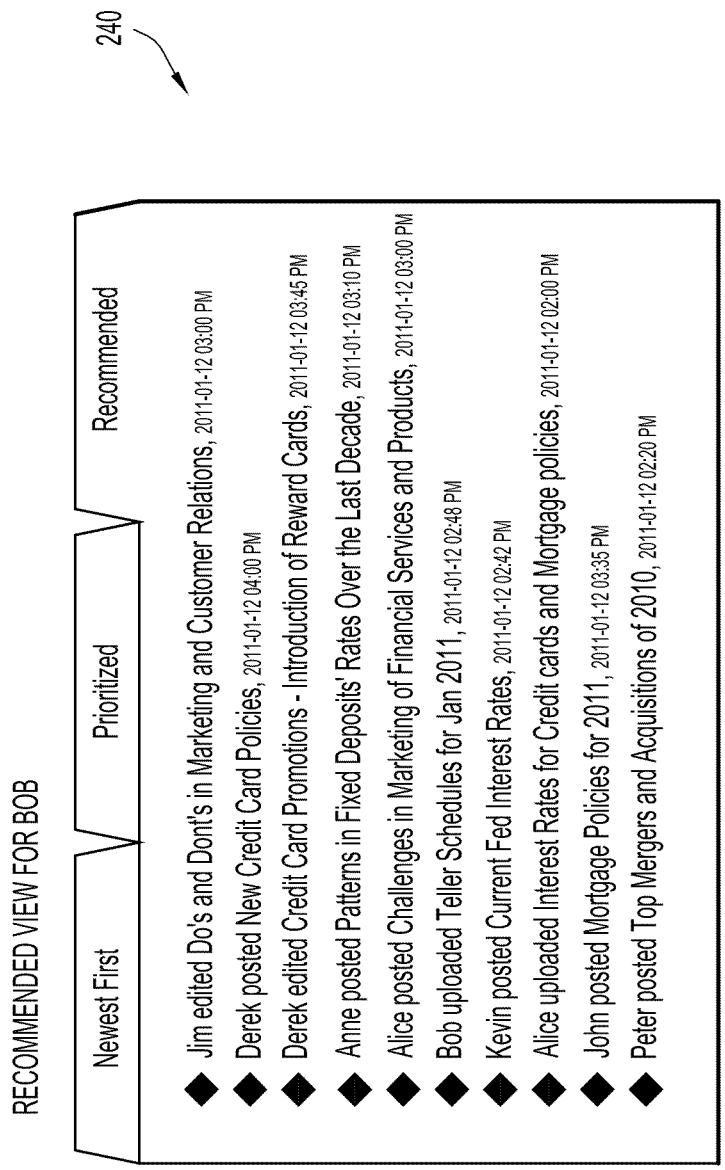
Figure 12:
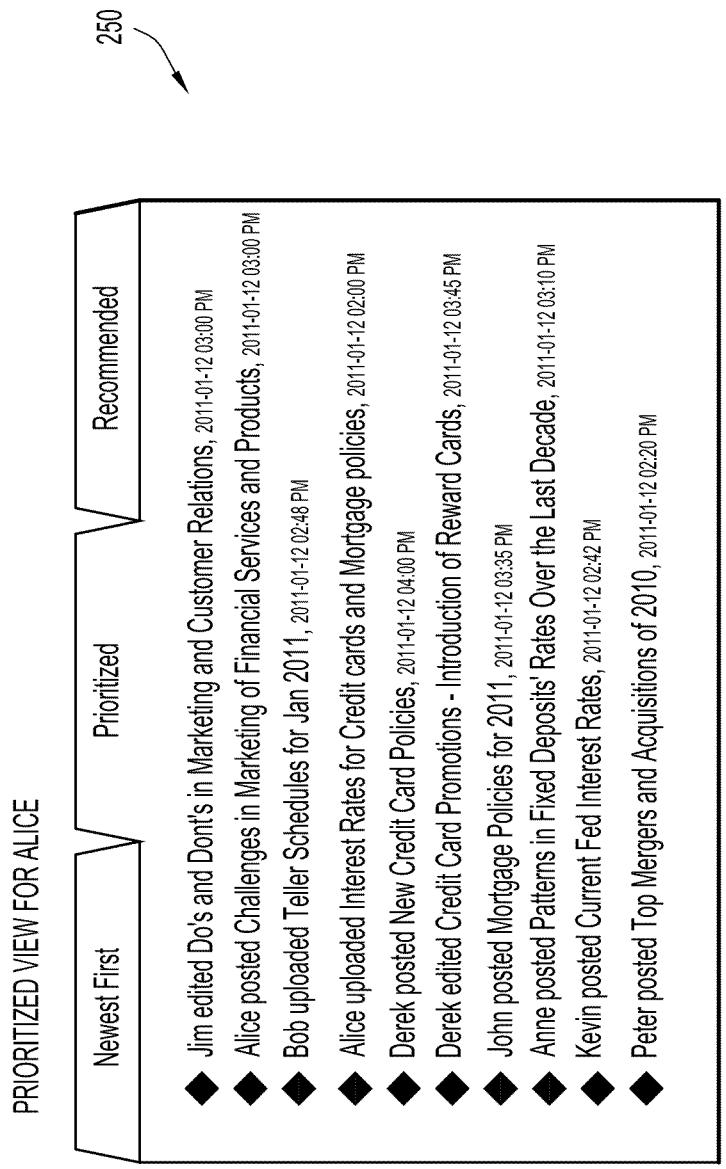
Figure 13:
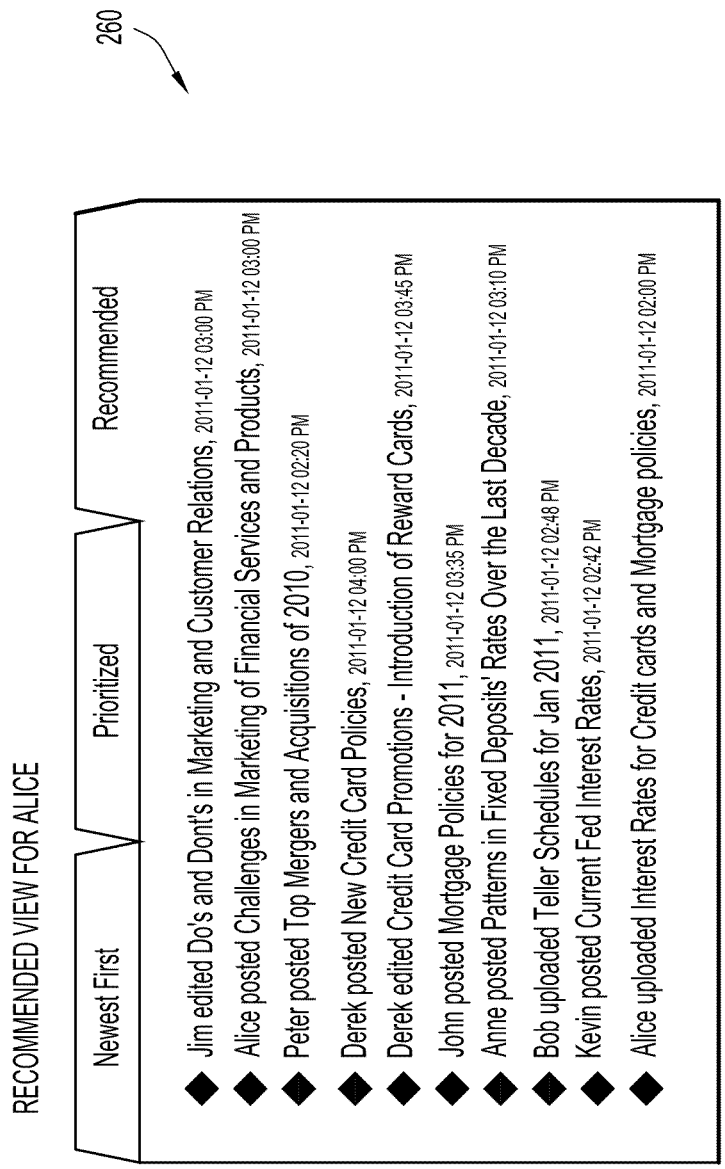

The heuristics based ("Prioritized") and semantic based ("Recommended") listings of updates for Bob are respectively depicted in FIGS. 10 and 11, while the heuristics based ("Prioritized") and semantic based ("Recommended") listings of updates for Alice are respectively depicted in FIGS. 12 and 13. Bob has a job profile of branch manager, has Alice as his direct manager, and has work projects associated with supervising all tellers (including credit cards and mortgages). The HPW values for Bob are set accordingly as shown in Table 2 and based upon Bob's reporting structure and work projects associated with his account. For example, activity 10 has the highest HPW value for Bob (HPW=3) due to this update having Alice (Bob's immediate manager) as the author/poster, and also due to the content of this activity being related to both credit cards and mortgages. Thus, activity 10 also appears at the top of the heuristics based ("Prioritized") list 230 for Bob, with the other updates also being listed according to their HPW values (with updates having the same HPW values being ordered based upon temporal order). Due to Bob's expertise being in credit cards and fixed deposits and interests being federal interest rates, marketing and customer relations (as shown in the interests section 62 of the GUI 60 for Bob's account, FIG. 4, and also in Table 1), activity 5 has the greatest SRW value due to the content of this update relating to marketing and customer relations. Accordingly, activity 5 appears at the top of Bob's semantics based ("Recommended") list 240 as depicted in FIG. 11.

Alice has a reporting structure that includes Bob as a user that is directly below Alice in the hierarchical structure and in which Bob reports directly to Alice on work related projects. In addition, Alice's work projects relate to managing all supervisors and also marketing (as indicated in Table 1). Based upon this heuristic information for Alice, activities 5-7 and 10 are assigned HPW=1, while the other activities are assigned HPW=0. Thus, for the heuristics based ("Prioritized") list 250 of updates for Alice as depicted in FIG. 12, activities 5-7 and 10 are listed first (in temporal order), with the remaining activities having lower HPW values then listed (in temporal order). Alice's expertise is in marketing and her interests are mergers and acquisitions (as shown in the interests section 72 of the GUI 70 of Alice's account at FIG. 5, also shown in Table 1). Accordingly, activities 5, 6 and 9 all have SRW=1, while the remaining updates have a value of SRW=0. The semantics based ("Recommended") list 260 for Alice orders activities 5, 6 and 9 at the top of the list (in temporal order), with the remaining updates then listed (in temporal order).

Thus, each user is provided with his or her own prioritized lists of updates which are determined based upon the user's specific profile. While heuristics based and semantic based orders have been described as two possible types of ordering of updates, any one or more other suitable algorithms can also be applied, utilizing the enterprise collaboration application modules of the computing devices and/or servers that host operations and interactions between computing devices within the collaboration platform, to order the incoming updates of activities, notifications and/or any other types of content to a user's account based upon any one or more selected types of criteria. For example, an ordering of updates can be based upon a combination of the HPW and SRW weighted values to obtain an ordered list that includes heuristic based and semantic based elements as obtained from information associated with a user's account. Any other possible ordering criteria can also be applied to change a temporal or time based (newest first) ordering of updates into a different listing of updates.

The ordering of updates to a user's account for a collaboration platform can render activities, notifications or other events that occur within the platform based upon exchange of information between users more efficient, since updates that are of greater importance or significance to a user (based upon the user's known profile) will be positioned at a higher level within the listing of updates (e.g., up at or toward the front or top of the list). This ensures a more prominent presence of such updates within the list, providing the user with the ability to act more promptly on such updates, which can enhance communications and collaborative efforts on projects, activities or other events that occur over the collaboration platform.

The above description is intended by way of example only.

What is claimed is:

1. A method comprising:
    establishing a communication session between a computing device of a user and at least one other computing device within a collaboration platform to facilitate one or more communications between the user and other users associated with the collaboration platform;
    receiving updates to a user account of the user that is accessible via the user's computing device, wherein the updates provide information relating to posted activities, notifications or other content and individuals associated with the posted activities, notifications or other content, the posted activities, notifications or other content being available at one or more computing devices associated with the platform;
    generating, at the one or more computing devices, weighted data structures for both (i) a heuristic order of the updates that prioritizes the updates based on work projects associated with the user and a reporting hierarchy for the user as identified in a user profile of the user associated with the user account, and (ii) a semantic order of the updates based on user interests in the profile, wherein the generating the semantic order comprises:
        assigning a semantic recommended weight to each update based at least in part upon at least one of:
            content associated with the update being related to keywords or phrases defined within an interest category or an expertise category of the user profile; and
            other semantic information comprising information about at least one of social relationships and a tag cloud associated with the user profile;
    automatically organizing, at the one or more computer devices, the updates in the heuristic order and the semantic order based on the generated weighted data structures;
    selecting, at the one or more computer devices, either the heuristic order or the semantic order of the updates; and
    providing, at the computing device of the user, a listing of the updates in the selected order.

2. The method of claim 1, wherein the generating weighted data structures for a heuristic order of the updates comprises:
    assigning a heuristics priority weight to each update based at least in part upon a distance between the user and another user within the reporting hierarchy that is associated with the update.

3. The method of claim 1, wherein the generating weighted data structures for a heuristic order of the updates comprises:
    assigning a heuristic priority weight to each update based at least in part upon at least one of the updates being related to the work projects associated with the user in an employment scope of the user and a distance between the user and another user within the reporting hierarchy that is associated with the update.

4. The method of claim 1, wherein the generating weighted data structures for a semantic order further comprises:
    prioritizing updates based upon user expertise as identified by the user profile.

5. The method of claim 1, wherein the generating weighted data structures for a semantic order further comprises:
    prioritizing updates based upon user information comprising at least one of social relationships and a tag cloud of the user as identified by the user profile.

6. The method of claim 1, further comprising:
    providing an indication for at least one update, wherein the indication comprises a description regarding a reason for providing the update at its location within the listing of updates.

7. An apparatus comprising:
    a memory configured to store instructions including one or more enterprise collaboration applications;
    a network interface configured to facilitate communication with at least one other computing device; and
    a processor configured to execute and control operations of the one or more enterprise collaboration applications so as to:
        establish a communication session between the apparatus and at least one computing device within a collaboration platform to facilitate one or more communications between a user of the apparatus and other users associated with the collaboration platform;
        receive updates to a user account of the user that is accessible via the apparatus, wherein the updates provide information relating to posted activities, notifications or other content and individuals associated with the posted activities, notifications or other content, the posted activities, notifications or other content being available at one or more computing devices associated with the platform;
        generate weighted data structures for both (i) a heuristic order of the updates that prioritizes the updates based on work projects associated with the user and a reporting hierarchy for the user as identified in a user profile of the user associated with user account, and (ii) a semantic order of the updates based on user interests in the profile by assigning a semantic recommended weight to each update based at least in part upon at least one of content associated with the update being related to keywords or phrases defined within an interest category or an expertise category of the user profile and other semantic information comprising at least one of information about social relationships and a tag cloud associated with the user profile;
        organize the updates the heuristic order and the semantic order based on the generated weighted data structures; and
        provide a listing of the updates based upon a selected one of the heuristic or semantic orders determined by the organize operation.

8. The apparatus of claim 7, wherein the processor is configured to generate the weighted data structures for a heuristic order that prioritizes updates based at least in part upon a reporting structure that defines the reporting hierarchy between the user and other users in the reporting hierarchy.

9. The apparatus of claim 8, wherein the processor is configured to assign a heuristics priority weight to each update based at least in part upon a distance between the user and another user within the reporting hierarchy that is associated with the update.

10. The apparatus of claim 7, wherein the processor is configured to generate the weighted data structures for a heuristic order by assigning a heuristic priority weight to each update based at least in part upon at least one of the updates being related to the work projects associated with the user in an employment scope of the user and a distance between the user and another user within the reporting hierarchy that is associated with the update.

11. The apparatus of claim 7, wherein the processor is configured to generate the weighted data structures for a semantic order that further prioritizes updates based at least in part upon user expertise as identified by the user profile.

12. The apparatus of claim 7, wherein the processor is configured to generate the weighted data structures for a semantic order that further prioritizes updates based at least in part upon other user semantic information comprising at least one of social relationships and a tag cloud of the user as identified by the user profile.

13. The apparatus of claim 7, wherein the processor is further configured to execute and control operations of the one or more enterprise collaboration applications so as to provide an indication for at least one update, wherein the indication comprises a description regarding a reason for providing the update at its location within the listing of updates.

14. One or more computer readable storage devices encoded with software comprising computer executable instructions and when the software is executed operable to:
   establish a communication session between a computing device of a user and at least one other computing device within a collaboration platform to facilitate one or more communications between the user and other users associated with the collaboration platform;
   receive updates to a user account of the user that is accessible via the user's computing device, wherein the updates provide information relating to posted activities, notifications or other content and individuals associated with the posted activities, notifications or other content, the posted activities, notifications or other content being available at one or more computing devices associated with the platform;
   generate weighted data structures for both (i) a heuristic order of the updates that prioritizes the updates based on work projects associated with the user and a reporting hierarchy for the user as identified in a user profile of the user associated with user account, and (ii) a semantic order of the updates based on user interests in the profile so as to assign a semantic recommended weight to each update based at least in part upon at least one of content being associated with the update that is related to keywords or phrases defined within an interest category or an expertise category of the user profile and other semantic information comprising information about at least one of social relationships and a tag cloud associated with the user profile;
   organize the updates the heuristic order and the semantic order based on the generated weighted data structures; and
   provide a listing of the updates based upon a selected one of the heuristic or semantic orders determined by the organize operation.

15. The one or more computer readable storage devices of claim 14, wherein the instructions are operable to generate the weighted data structures for a heuristic order that prioritizes updates based at least in part upon a reporting structure that defines a reporting hierarchy between the user and other users in the reporting hierarchy.

16. The one or more computer readable storage devices of claim 15, wherein the instructions are operable to assign a heuristics priority weight to each update based at least in part upon a distance between the user and another user within the reporting hierarchy that is associated with the update.

17. The one or more computer readable storage devices of claim 14, wherein the instructions are operable to generate the weighted data structures for a heuristic order by assigning a heuristic priority weight to each update based at least in part upon at least one of the updates being related to the work projects associated with the user in an employment scope of the user and a distance between the user and another user within the reporting hierarchy that is associated with the update.

18. The one or more computer readable storage devices of claim 14, wherein the instructions are further operable to generate the weighted data structures for a semantic order that prioritizes updates based at least in part upon user expertise as identified by the user profile.

19. The one or more computer readable storage devices of claim 14, wherein the instructions are further operable to generate the weighted data structures for a semantic order that prioritizes updates based at least in part upon information comprising at least one of social relationships and a tag cloud of the user as identified by the user profile.

20. The one or more computer readable storage devices of claim 14, and further comprising instructions that are operable to:
   provide an indication for at least one update, wherein the indication comprises a description regarding a reason for providing the update at its location within the listing of updates.

* * * * *